Patented Oct. 12, 1943

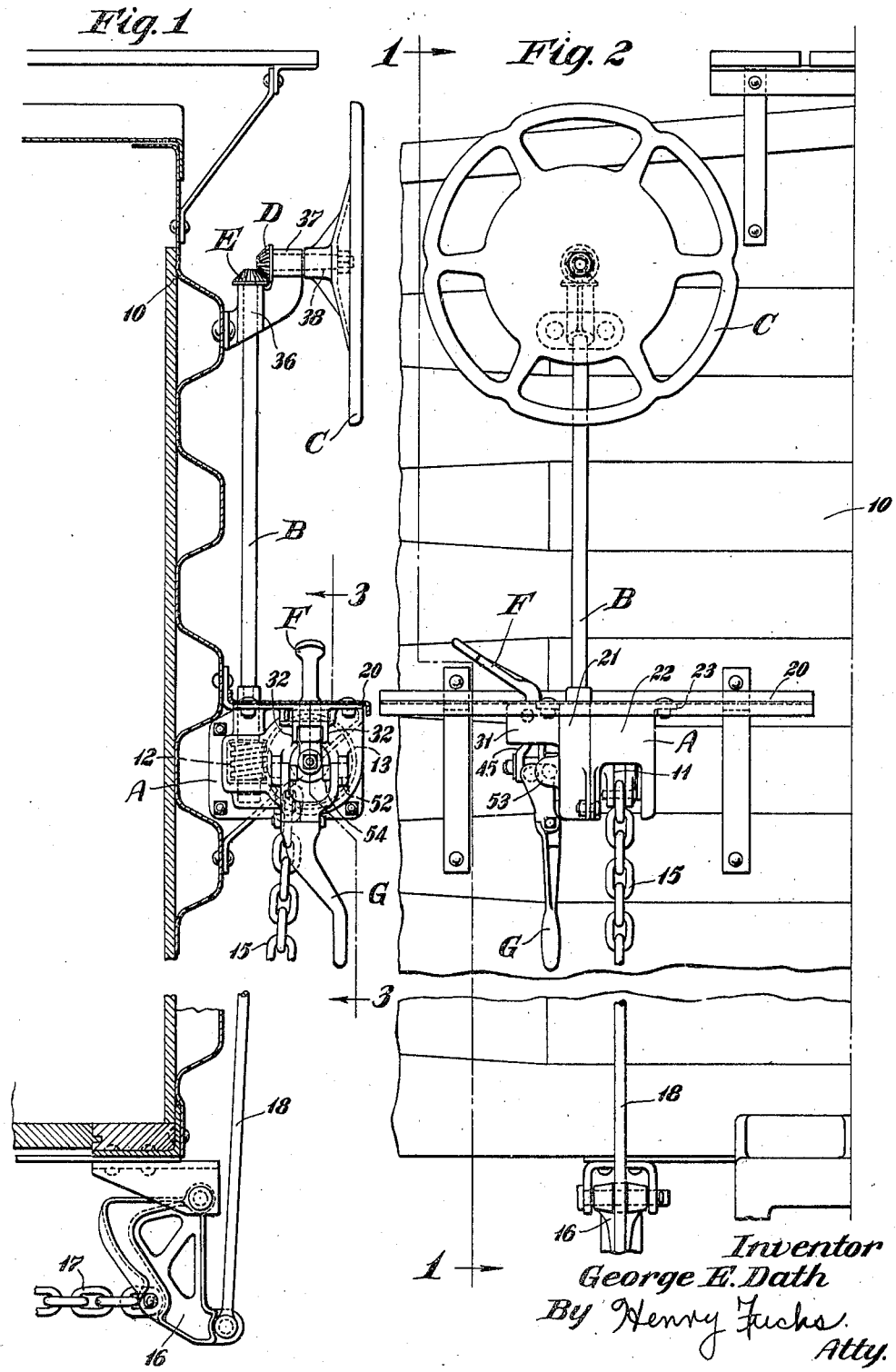

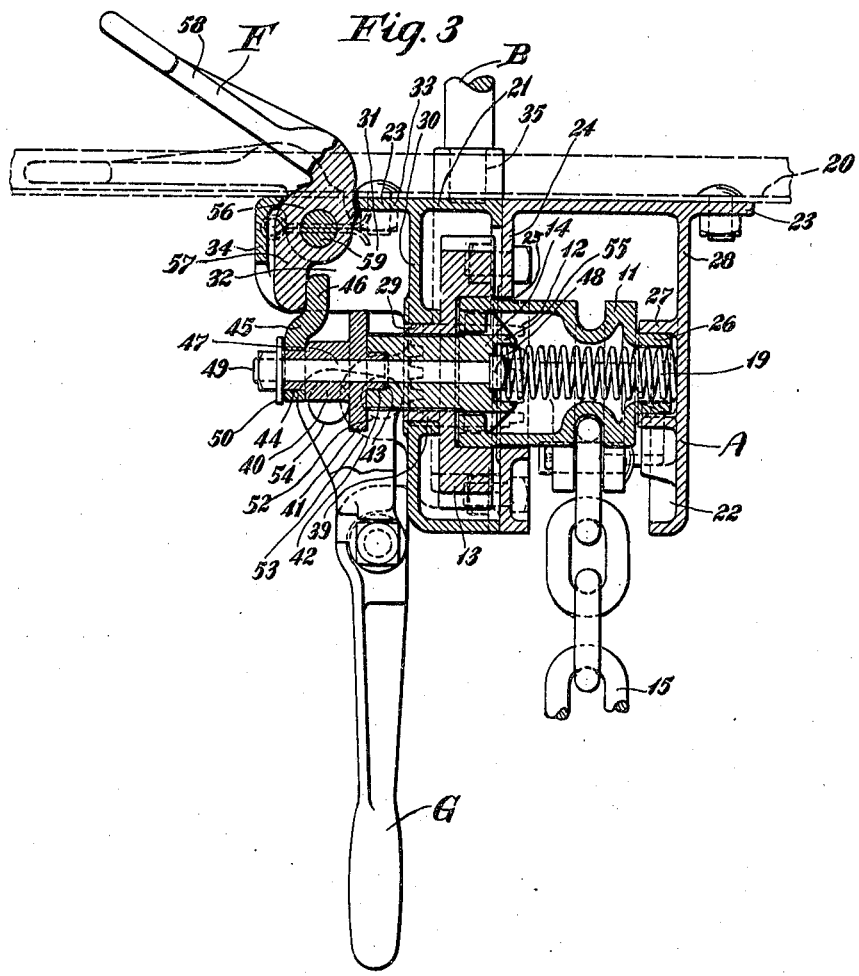

2,331,459

UNITED STATES PATENT OFFICE 2,331,459

HAND BRAKE

George E. Dath, Mokena, Ill., assignor to W. H. Miner, Inc., Chicago, Ill., a corporation of Delaware Application October 31, 1941, Serial No. 417,293

5 Claims. (Cl. 74—505)

This invention relates to improvements in hand brakes, and more particularly to improvements in hand brakes of the worm gear operated type comprising chain winding means and hand wheel operated actuating mechanism, wherein the actuating mechanism is operatively connected to the winding mechanism for the brake chain by a releasable clutch to permit quick release of the brakes without spinning of the hand wheel.

One object of the invention is to provide a hand brake mechanism of the character specified wherein the clutch means for effecting quick release may be actuated by the brakeman's foot while he stands on the brakeman's step or platform.

Another object of the invention is to provide in a hand brake mechanism of the character indicated, means for releasing the clutch which may be actuated either by hand while the brakeman is standing on the ladder, or by pressure of the foot while he is standing on the brakeman's platform or step.

Other objects of the invention will more clearly appear from the description and claims hereinafter following.

In the drawings forming a part of this specification, Figure 1 is a vertical, longitudinal, sectional view through the end wall of a railway car, illustrating my improvements in connection therewith, the hand brake mechanism being shown in elevation, said view corresponding substantially to the line 1—1 of Figure 2 and being partly broken to accommodate the same to the sheet of the drawing. Figure 2 is a broken end elevational view of Figure 1. Figure 3 is a vertical, sectional view, on an enlarged scale, corresponding substantially to the line 3—3 of Figure 1.

In said drawings, 10 indicates the vertical end wall of a railway car on which is mounted the hand operated brake mechanism. The brake mechanism comprises a winding means which is worm gear actuated, and, as illustrated, this means is of well-known design, being similar to that disclosed in Patent No. 2,160,279, granted May 30, 1939, to R. J. Olander, and Patent No. 1,974,531, granted September 25, 1934, to R. J. Olander. This worm gear actuated winding means includes a chain winding drum 11, a worm 12, a worm wheel 13 driven by the worm, and a clutch 14, all similar to the corresponding mechanism described in the patents referred to and operating in a similar manner. The usual brake chain 15 is anchored to the drum and is windable thereon to apply the brakes. The power is transmitted from the hand brake mechanism to the brake shoes, not shown, of the car by well-known mechanism comprising a bell crank 16 swingingly mounted on the car, a chain 17 connected to the bell crank and leading to the brake mechanism proper of the car, and a pull-up rod 18 connecting the bell crank to the chain 15.

As disclosed herein and shown in the patents referred to, the worm 12 meshes with the worm wheel 13 and imparts rotary movement to the latter. The clutch 14 serves to operatively connect the winding drum 11 to the worm wheel 13 and rotary movement of the drum is thus effected when the worm is rotated. The clutch element 14 is held operatively engaged with clutch means on the drum 11 by a spring 19 contained in the hollow portion of said drum. The clutch means on the drum comprises a series of teeth which cooperate with teeth on the clutch element 14. The element 14 is splined to the worm wheel 13 to rotate in unison therewith and slide axially thereof.

In carrying out my invention, I provide a housing A within which the drum 11, worm 12, and worm wheel 13 are contained, the housing being secured to the brake step or platform 20 which is supported by the usual brackets attached to the end wall 10 of the car; a brake staff B connected to the worm 12; a hand wheel C; beveled gears D and E for transmitting power from the hand wheel to the staff B; a foot operated lever F for actuating the clutch element 14; and a hand actuated lever G by which said clutch element is also actuated.

The housing A is vertically divided into two hollow sections 21 and 22. Each section is preferably in the form of a casting. The housing section 22, as clearly shown in Figures 2 and 3, is open at the bottom to accommodate the brake chain 15 for movement. At their meeting edges the housing sections 21 and 22 are bolted together, as shown, to hold the sections assembled. Each section is also provided with a laterally extending flange 23 at the top thereof by which the housing is secured to the brake step 20 beneath the same, bolts being preferably employed, extending through said flanges and the brakeman's step. The housing A is further provided with a vertical partition wall 24 which is formed on the section 22 and divides the housing into two compartments. The wall 24 is provided with an opening 25 accommodating the left hand end of the drum 11, as seen in Figure 3. The right hand end of the drum 11 has a reduced bearing portion 26 journaled in an inwardly projecting cylindrical bearing flange 27 on the outer side wall 28 of the housing section 22. As will be seen, the side wall 28 is parallel to the partition wall 24. The worm wheel 13, which is contained in the section 21 of the housing, is journaled on the left hand end of the drum 11, as seen in Figure 3, and has an integral bearing hub 39 at its left hand end journaled in a bearing opening 29 provided in the outer side wall 30 of the housing section 21.

The housing section 21 is further provided with an extension 31 at the left hand side thereof, as seen in Figure 3, said extension being at the top of the housing immediately above the bearing opening 29. This extension is formed integral with the section 21 of the housing and has spaced side walls 32—32, a top wall 33, and an outer end wall 34. The bottom of the wall 34 terminates some distance above the lower edges of the side walls 32—32. As will be evident, the extension 31 is thus in the form of a hoodlike member which is open at the bottom.

The worm 12 is vertically disposed and is suitably journaled in the housing A for rotary movement and preferably has journal portions at its top and bottom ends seated in bearings in the housing. The journal portion at the top of the worm extends through the top wall of the housing and projects above the brakeman's step or platform, as clearly shown in Figure 3, and is connected to the lower end of the staff B to rotate therewith. Any suitable means may be provided for this purpose, the staff being preferably provided with a square lower end portion 35 seated in a square socket in the projecting journal portion at the top end of the worm 12.

The upper end of the staff B is rotatably mounted in a bearing bracket 36 secured to the vertical end wall of the car, and has the beveled gear E fixed to said upper end. The bracket 36 has an outstanding arm 37 in which a short, horizontally disposed, shaft 38 is journaled. The hand wheel C by which the brake mechanism is actuated is fixed to the outer end of the shaft 38. The beveled gear D, which meshes with the beveled gear E, is secured to the inner end of the shaft 38.

The clutch element 14, which is slidingly mounted in the hub 39 of the worm wheel 13 projects outwardly of the housing beneath the hoodlike extension 31 and has a spool member 40 attached thereto. The spool member has a single annular flange 41 at its right hand end, which end bears on the outer end of the clutch element 14, and has a square projection 42 of reduced size engaging in a square seat 43 of said clutch element. The outer or left hand end of the spool 40 is also reduced in diameter, as indicated at 44, said portion 44 being cylindrical. A plate member 45 is mounted on the portion 44, said plate member having a circular opening into which the portion 44 extends. The plate member 45 projects upwardly into the hoodlike extension 31 and is guided between the side walls of the latter. The extreme upper end portion of said plate 45 is laterally offset, as indicated at 46, for a purpose hereinafter described. The spool 40 and the plate 45 are held assembled with the clutch element 14 by a bolt 47 extending through aligned bores in said clutch element and spool, the head 48 of the bolt 47 being seated on the inner end of the clutch element, and the nut 49 of the bolt being seated on a washer 50 which bears on the outer end of the reduced portion 44 of the spool 40. Slight clearance is provided between the washer 50 and the outer side of the plate 45 to permit free rotation of the spool with respect to the plate 45. As will be evident, the plate 45 is moveable in unison with the spool 40 in lengthwise direction but is held against rotation therewith by having its offset upper end portion 46 guided between the side walls 32—32 of the hood member 31.

The clutch shifting hand lever G is identical with that described in Patent No. 2,160,279 and is pivoted at 52 in spaced ears 53 projecting from the housing section 21. The lever G has trunnions 54—54 at opposite sides of the spool 40 of the clutch adapted to engage the flange 41 for shifting the clutch. The clutch element 14 has a clutch head 55 at its inner end which cooperates with the drum to lock the drum to the worm wheel 13 for rotation with the latter, the head 55 and the worm wheel being provided with interengaging means of the character described in Patent No. 2,160,279, and the clutch element being splined to the worm wheel as described in said patent. Thus, when the parts of the mechanism are in the position shown in Figure 3, the clutch is operatively engaged with the drum to impart rotation thereto as the worm wheel 13 is rotated. To disengage the clutch and permit free rotation of the drum 11 to quickly release the brakes, the clutch is shifted to the right from the position shown in Figure 3 a sufficient distance to disengage the clutch head from the cooperating clutch means of the worm wheel 13. In quickly releasing the brakes by the hand lever G, the hand grip end of the latter is swung in clockwise direction, as seen in Figure 3.

The foot operated lever or treadle F comprises a relatively thick head portion 56 having a projecting lug 57 at the bottom side thereof adapted to engage the end portion 46 of the plate 45. At the upper side, the head 56 is provided with an angularly extending platelike arm 58 which forms the treadle member. The lever F is pivotally supported by a short shaft 59 extending through the head 56 of the lever and having its opposite ends seated in openings provided in the side walls 32—32 of the hood member 31. The lever F extends through the top wall 33 of the hood member 31, said wall being provided with an opening of sufficient size to freely accommodate the upper end portion of the enlargement 56 during pivotal movement of the lever in shifting the clutch element 14.

In the normal position of the parts, as shown in Figure 3, the spring 19 holds the clutch element in engaged position, thereby maintaining the lever F in the inclined position shown in said figure. To disengage the clutch to quickly release the brakes, the foot operated lever F is depressed to the dotted line position shown, thereby shifting the clutch to the right through engagement of the lug 57 of the lever F with the plate 45 which is connected to the spool 40 of the clutch. During this action the lever G remains idle, the lower end portion of the plate 45 being reduced in size to freely pass the trunnions 54—54 of the lever G. Upon complete disengagement of the clutch, the drum 11 is free to rotate, thereby effecting quick release of the brakes. The spring 19 returns the clutch element to the normal position when the actuating force is removed from either the lever F or the lever G, thereby restoring all of the parts to the normal position shown in Figure 3.

I have herein shown and described what I now consider the preferred manner of carrying out my invention, but the same is merely illustrative and I contemplate all changes and modifications that come within the scope of the claims appended hereto.

I claim:

1. In a hand brake mechanism for a railway car having a brakeman's step mounted on the end of the car, the combination with a housing secured to the step underneath the same; of chain winding means; means for rotating said winding means, said winding means and means for rotating the same being mounted in the housing; a clutch element operatively connecting said winding means and means for rotating the same; a pivoted clutch shifting foot operated lever operatively connected to said clutch element for shifting said clutch element, said lever extending upwardly through said step; and a second clutch shifting lever operatively connected to said clutch element for shifting the same, said last named lever being disposed below said step and adapted for operation by hand.

2. In a hand brake mechanism for a railway car having a brakeman's step mounted on the end of the car, the combination with a chain winding means; of means for rotating said winding means, said winding means and means for rotating the same being mounted underneath the brake step; a clutch element operatively connecting said winding means and means for rotating the same; a pivoted clutch shifting foot operated lever extending upwardly through said step and operatively connected to said clutch element for shifting the same; and a second pivoted clutch shifting lever operatively connected to said clutch element for shifting the same, said last named lever being disposed below said step and adapted for operation by hand.

3. In a hand brake mechanism for a railway car having a brakeman's step mounted on the end of the car, the combination with a chain winding drum; of rotary actuating means for rotating said drum; a clutch element operatively connecting said actuating means and drum; an upstanding pivoted lever operatively connected to said clutch element for shifting said clutch element, said winding drum, actuating means, and clutch element being mounted underneath the brake step with said upstanding lever extending through the step; and an additional clutch shifting lever below said step operatively connected to said clutch element for shifting the same.

4. In a hand brake mechanism for a railway car having a brakeman's step mounted on the end of the car, the combination with a housing secured to said step underneath the same; of a chain winding drum; a worm wheel for rotating said drum, said drum and worm wheel being mounted in said housing; a clutch operatively connecting said worm wheel and drum; a worm for driving said worm wheel; hand actuated means for rotating said worm; and means for shifting said clutch to disengage the drum from said worm wheel, said means including two independently actuated shifting levers, one of said levers extending upwardly through said step and being pivotally mounted on said housing and the other of said levers depending from said housing and being pivotally supported on the same.

5. In a hand brake mechanism for a railway car having a brakeman's step mounted on the end of the car, the combination with a vertical brake staff mounted on the end of the car; of a hand wheel rotatable about a horizontal axis, said hand wheel being mounted on the end of the car; intermeshing beveled gears operatively connecting the hand wheel to said staff, said staff extending downwardly to the brake step; a worm fixed to the lower end portion of said staff; a worm wheel driven by said worm; a rotary chain winding drum, said drum, worm wheel, and worm being mounted underneath said step; a sliding clutch operatively connecting said worm wheel and drum; an upstanding lever pivoted beneath said step and extending upwardly through said step to be actuated by the brakeman's foot, said lever being operatively connected to the clutch to shift the same; and a second lever pivoted beneath said step and operatively connected to said clutch for shifting the same, said second named lever being normally in pendant position and having the pivot point between the top and bottom ends thereof, said bottom end providing a hand grip portion.

GEORGE E. DATH.